US012627512B2

(12) United States Patent
Kaufmann et al.

(10) Patent No.: US 12,627,512 B2
(45) Date of Patent: *May 12, 2026

(54) MUTUAL AUTHENTICATION WITH PSEUDO RANDOM NUMBERS

(71) Applicant: ASSA ABLOY AB, Stockholm (SE)

(72) Inventors: Martin Kaufmann, Graz (AT); Adam Augustyn, Krzeszowice (PL)

(73) Assignee: ASSA ABLOY AB, Stockholm (SE)

( * ) Notice: Subject to any disclaimer, the term of this patent is extended or adjusted under 35 U.S.C. 154(b) by 175 days.

This patent is subject to a terminal disclaimer.

(21) Appl. No.: 18/545,432

(22) Filed: Dec. 19, 2023

(65) Prior Publication Data

US 2024/0121112 A1 Apr. 11, 2024

Related U.S. Application Data

(63) Continuation of application No. 17/025,111, filed on Sep. 18, 2020, now Pat. No. 11,895,251.

(51) Int. Cl.
*H04L 9/32* (2006.01)
*H04L 9/08* (2006.01)
(52) U.S. Cl.
CPC .......... *H04L 9/3273* (2013.01); *H04L 9/0819* (2013.01); *H04L 9/0869* (2013.01)
(58) Field of Classification Search
CPC .... H04L 9/3273; H04L 9/0819; H04L 9/0869
(Continued)

(56) References Cited

U.S. PATENT DOCUMENTS

| 8,694,783 B2 | 4/2014 | Fahn et al. | |
| 2004/0166942 A1* | 8/2004 | Muir .................. | G07F 17/3241 |
| | | | 463/43 |

(Continued)

FOREIGN PATENT DOCUMENTS

| CN | 102037707 | 4/2011 |
| CN | 110912852 | 3/2020 |

(Continued)

OTHER PUBLICATIONS

"International Application Serial No. PCT EP2021 075646, International Search Report mailed Jan. 5, 2022", 5 pgs.

(Continued)

*Primary Examiner* — Moeen Khan
(74) *Attorney, Agent, or Firm* — Schwegman Lundberg & Woessner, P.A.

(57) ABSTRACT

A verifier device of an authentication system comprises physical layer circuitry and processing circuitry coupled to the physical layer circuitry. The processing circuitry is configured to encode an authentication command for sending to a credential device; decode a response communication received from the credential device, wherein the response communication includes a first random number; encrypt the first random number, a second random number, and verifier keying material for sending to the credential device; decrypt encrypted information received from the credential device, wherein the encrypted information includes the first random number, the second random number, and receiver keying material; and calculate a session encryption key using the verifier keying material and the receiver keying material.

18 Claims, 4 Drawing Sheets

(58) Field of Classification Search
USPC ......................................................... 713/169
See application file for complete search history.

(56) References Cited

U.S. PATENT DOCUMENTS

| | | | | |
|---|---|---|---|---|
| 2007/0124589 | A1* | 5/2007 | Sutton | G06F 21/32 |
| | | | | 713/169 |
| 2008/0044011 | A1 | 2/2008 | Yoshida et al. | |
| 2009/0041028 | A1* | 2/2009 | Kramer | H04L 7/033 |
| | | | | 370/395.62 |
| 2009/0259850 | A1* | 10/2009 | Ishibashi | H04L 9/3273 |
| | | | | 713/169 |
| 2010/0316217 | A1 | 12/2010 | Gammel et al. | |
| 2015/0113276 | A1* | 4/2015 | Day | H04L 9/0819 |
| | | | | 713/171 |
| 2016/0277189 | A1 | 9/2016 | Ahn et al. | |
| 2017/0118641 | A1 | 4/2017 | Ishibashi | |
| 2019/0036689 | A1* | 1/2019 | Schiffman | H04L 9/0861 |
| 2019/0342081 | A1* | 11/2019 | Tanimoto | H04L 9/0894 |
| 2020/0036518 | A1* | 1/2020 | Oda | G06F 7/582 |
| 2021/0144140 | A1* | 5/2021 | Murphy | H04L 9/321 |
| 2022/0094558 | A1 | 3/2022 | Kaufmann et al. | |

FOREIGN PATENT DOCUMENTS

| | | |
|---|---|---|
| CN | 116349202 | 6/2023 |
| WO | 2022058518 | 3/2022 |

OTHER PUBLICATIONS

"International Application Serial No. PCT EP2021 075646, Written Opinion mailed Jan. 5, 2022", 9 pgs.

"U.S. Appl. No. 17/025,111, Non Final Office Action mailed May 23, 2022", 25 pgs.

"U.S. Appl. No. 17/025,111, Response filed Sep. 23, 2022 to Non Final Office Action mailed May 23, 2022", 10 pgs.

"U.S. Appl. No. 17/025,111, Final Office Action mailed Nov. 29, 2022", 25 pgs.

"U.S. Appl. No. 17/025,111, Response filed Jan. 27, 2023 to Final Office Action mailed Nov. 29, 2022", 9 pgs.

"U.S. Appl. No. 17/025,111, Advisory Action mailed Feb. 8, 2023", 3 pgs.

"International Application Serial No. PCT EP2021 075646, International Preliminary Report on Patentability mailed Mar. 30, 2023", 8 pgs.

"U.S. Appl. No. 17/025,111, Non Final Office Action mailed May 5, 2023", 28 pgs.

"U.S. Appl. No. 17/025,111, Response filed Aug. 4, 2023 to Non Final Office Action mailed May 5, 2023", 14 pgs.

"U.S. Appl. No. 17/025,111, Notice of Allowance mailed Sep. 25, 2023", 16 pgs.

"European Application Serial No. 21778413.1, Response to Communication Pursuant to Rules 161 and 162 EPC filed Oct. 25, 2023", 9 pgs.

Menezes, A J, "Chapter 12: Key Establishment Protocols Ed", Handbook of Applied Cryptography; [CRC Press Series on Discrete Mathematices and Its Applications], CRC Press, Boca Raton, FL, US, (Oct. 1, 1996), 489-541.

"Chinese Application Serial No. 202180071605.8, Office Action mailed Jun. 19, 2025", with English translation, 18 pages.

"European Application Serial No. 21778413.1, Communication Pursuant to Article 94(3) EPC mailed Dec. 6, 2024", 5 pages.

"European Application Serial No. 21778413.1, Response filed Mar. 18, 2025 to Communication Pursuant to Article 94(3) EPC mailed Dec. 6, 2024", 34 pages.

"Chinese Application Serial No. 202180071605.8, Response filed Nov. 7, 2025 to Office Action mailed Jun. 19, 2025", with English claims, 27 pages.

* cited by examiner

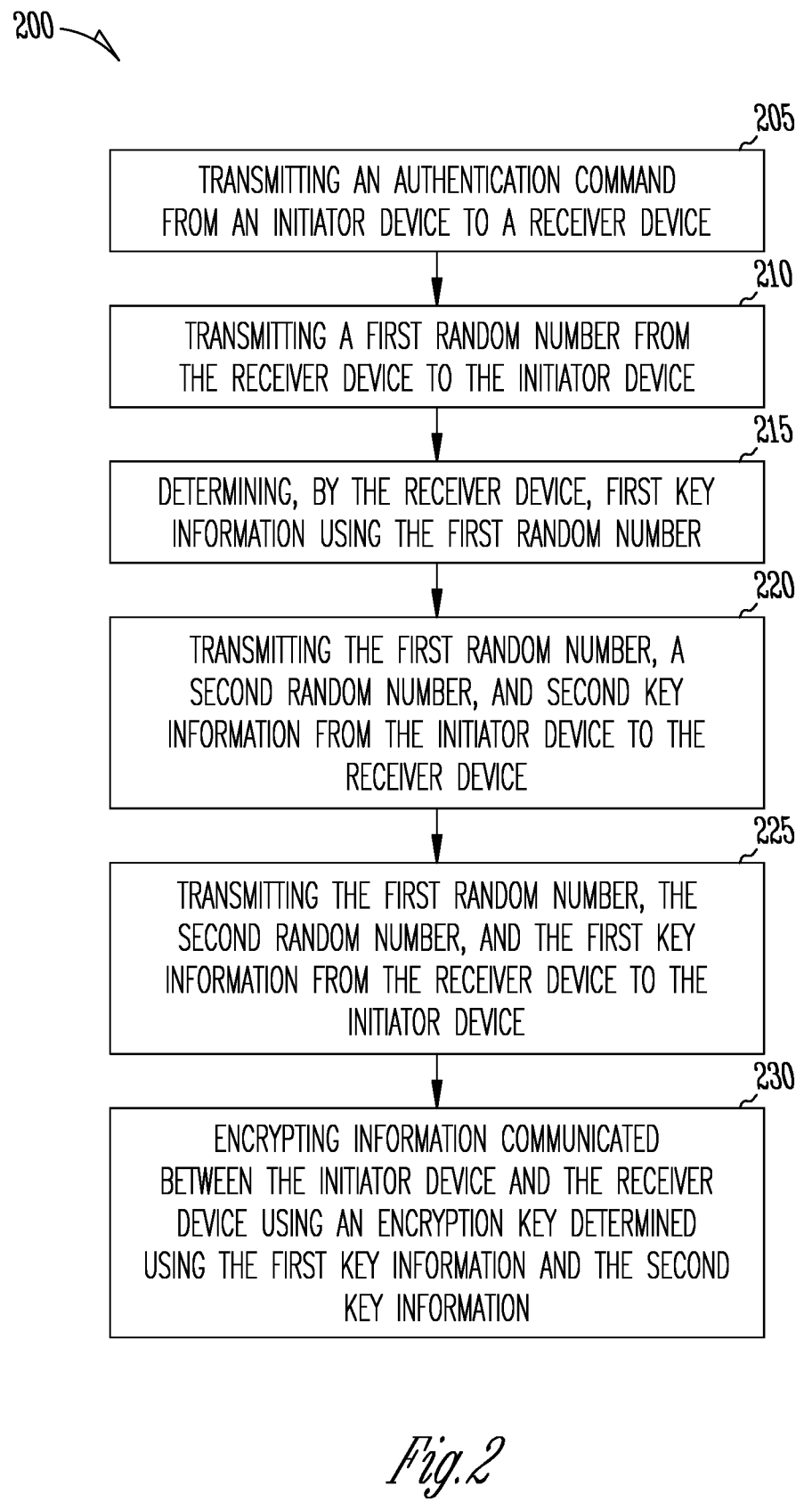

200 —

205
TRANSMITTING AN AUTHENTICATION COMMAND FROM AN INITIATOR DEVICE TO A RECEIVER DEVICE

210
TRANSMITTING A FIRST RANDOM NUMBER FROM THE RECEIVER DEVICE TO THE INITIATOR DEVICE

215
DETERMINING, BY THE RECEIVER DEVICE, FIRST KEY INFORMATION USING THE FIRST RANDOM NUMBER

220
TRANSMITTING THE FIRST RANDOM NUMBER, A SECOND RANDOM NUMBER, AND SECOND KEY INFORMATION FROM THE INITIATOR DEVICE TO THE RECEIVER DEVICE

225
TRANSMITTING THE FIRST RANDOM NUMBER, THE SECOND RANDOM NUMBER, AND THE FIRST KEY INFORMATION FROM THE RECEIVER DEVICE TO THE INITIATOR DEVICE

230
ENCRYPTING INFORMATION COMMUNICATED BETWEEN THE INITIATOR DEVICE AND THE RECEIVER DEVICE USING AN ENCRYPTION KEY DETERMINED USING THE FIRST KEY INFORMATION AND THE SECOND KEY INFORMATION

*Fig.2*

MUTUAL AUTHENTICATION WITH PSEUDO RANDOM NUMBERS

CLAIM OF PRIORITY

This patent application is a continuation of U.S. patent application Ser. No. 17/025,011, filed Sep. 18, 2020, the disclosure of which is incorporated by reference herein in its entirety.

TECHNICAL FIELD

Embodiments illustrated and described herein generally relate to automatic identity authentication systems that authenticate users for access to secure resources, and to techniques of secure messaging for identity authentication systems.

BACKGROUND

There are many applications for which quick and accurate authentication of identity of a person is desirable. Some examples include airline travel and secure access to controlled areas. Additionally, remote identity authentication for applications such as mobile online shopping or mobile banking is now a common practice. Device authentication can involve authentication information being exchanged between a server performing authentication and a credential device such as a smart card or a mobile phone. Secure messaging is used to enable transfer of sensitive information used in the authentication process.

BRIEF DESCRIPTION OF THE DRAWINGS

FIG. 2 is a flow diagram of an example of a method of device authentication.

DETAILED DESCRIPTION

Figure 1:
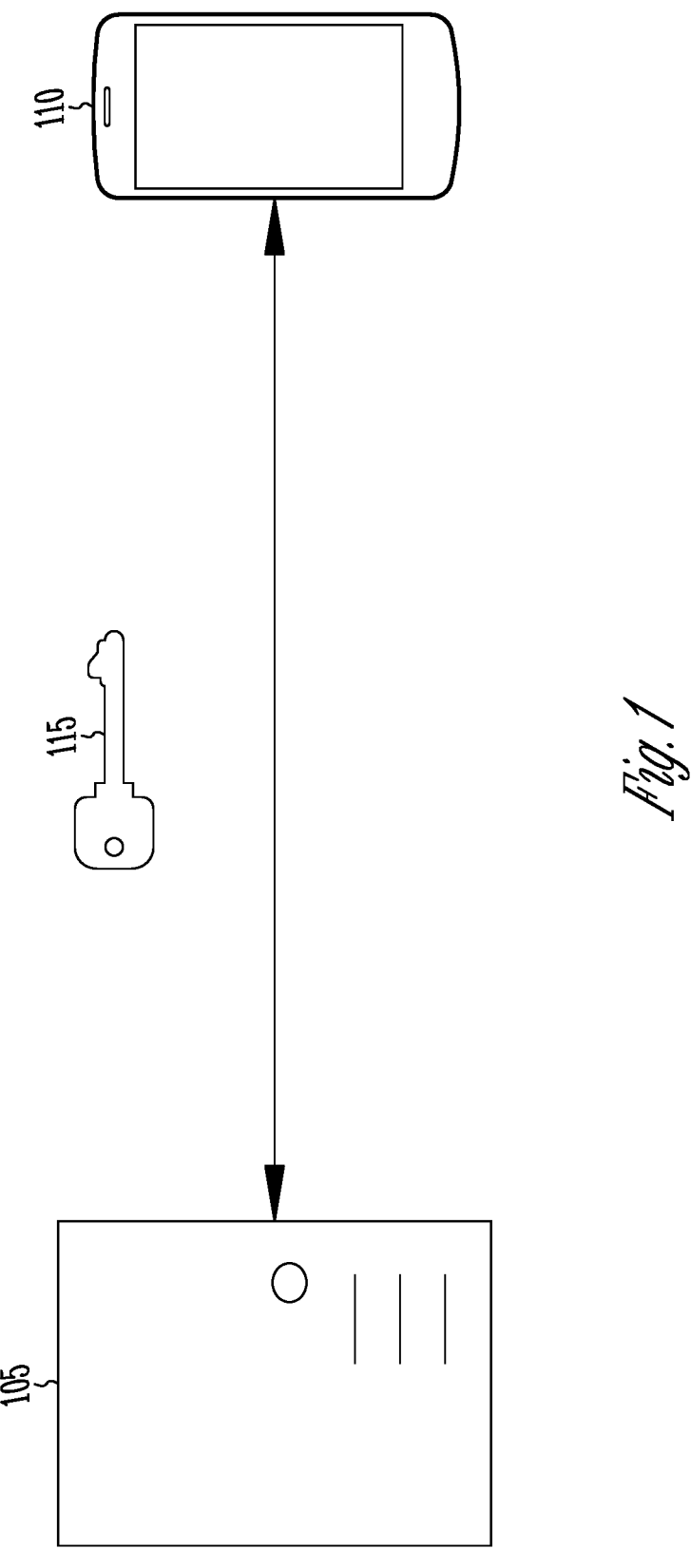
FIG. 1 is an illustration of an example of portions of an authentication system.

It is desirable for automatic authentication of a person's identity based on verifiable identity information to be fast and secure. Authentication may involve messaging to send sensitive identification information between a verifier device (e.g., a system server of an authentication system backend) and credential device (e.g., a smartcard or smartphone). FIG. 1 is an illustration of an example of a verifier device 105 and a credential device 110 that communicate using secure messaging. In the example, the verifier device 105 is a system server of an authentication system backend and the credential device 110 is a smartphone, but the verifier device and the credential device can be any two devices that use secure messaging. The credential device may store an access credential that provides controlled access to a resource such as a financial resource or a secured physical space. Authentication messaging is used to verify that the access credential provides the desired access. The authentication messaging can be made secure using one or more session keys 115 to encrypt the messages of a communication session between the devices. The keys can be shared according to a communication protocol.

To make the authentication automatic between the devices, the messaging that includes the key exchange can be scripted. The scripting can include a verifier device initiating a transaction to exchange keys. To make the key transaction scriptable, key information should be predictable.

FIG. 2 is a flow diagram of a method of device authentication between an initiator device that initiates the authentication and a receiver device. The method 200 may provide mutual authentication using secret messaging that is scriptable. The initiator device may be a verifier device and the receiver device may be a credential device. Alternatively, the credential device may be the initiator device, and the verifier device is the receiver device. At block 205, an authentication command is sent to the receiver device from the initiator device to trigger the authentication for secure messaging between the devices.

At block 210, a first random number $R_B$ is generated by the receiver device and transmitted from the receiver device to the initiator device. At block 215, the receiver device also determines receiver device keying information, or receiver device keying material, $F_B$. The keying material is calculated using the random number $R_B$ and a static encryption key $K_{ENC}$, or $$F_B = KDF(K_{ENC}, R_B),$$

where KDF is the key derivation function performed using processing circuitry of the receiver device. One or more keys are generated using $F_B$. In some examples, the random number $R_B$ is a true random number, and the static encryption key $K_{ENC}$ can be a device specific encryption key stored in the receiver device and the initiator device. The KDF binds the keying material $F_B$ to a specific context of the communication session. The context may be, among other things, an application, a key identifier, a session ID, etc.

To make the secure messaging scriptable, the receiver keying material $F_B$ is a predictable random number that can be determined by the initiator device. In response to receiving the communication that includes the random number $R_B$, the initiator device determines, the receiver keying material $F_B$, a second random number $R_A$ and initiator device keying material $F_A$. The initiator device keying material $F_A$ can be a random number. At block 220, the initiator device transmits random number $R_B$, random number $R_A$, and the initiator device keying material $F_A$ to the receiver device.

Figure 3:
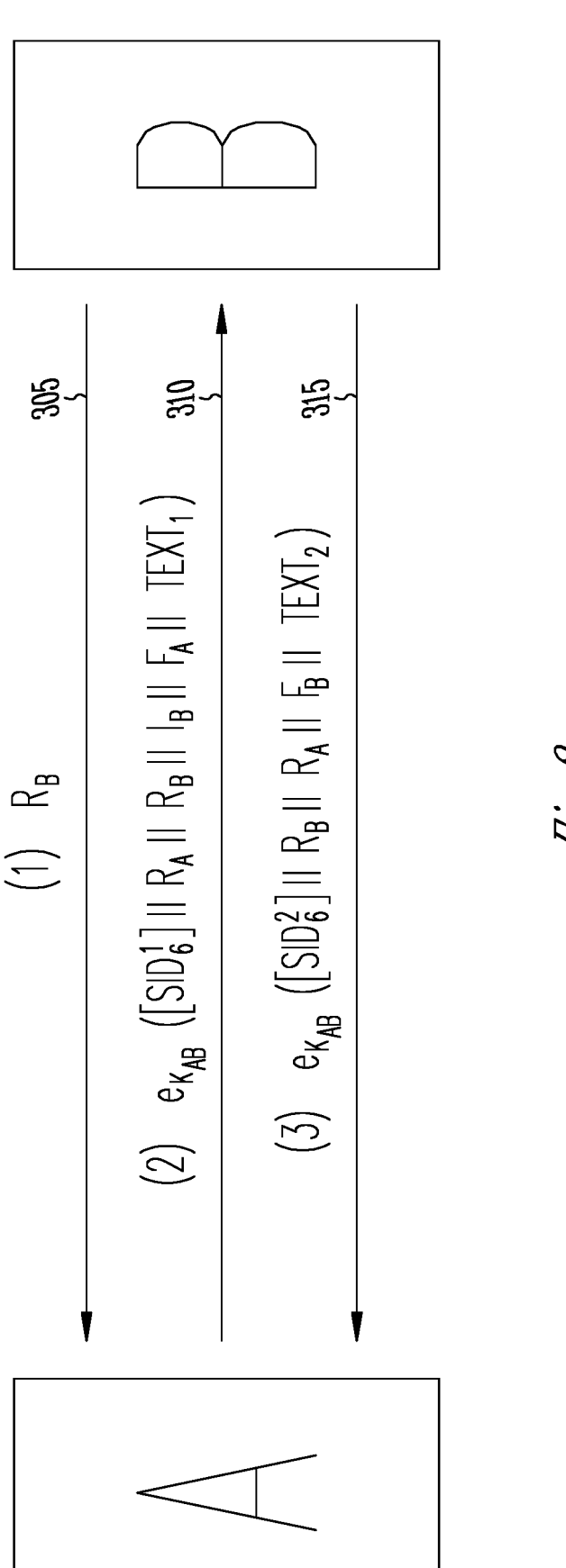
FIG. 3 is a block diagram illustrating an example of portions of a communication session for device authentication.

FIG. 3 is a block diagram illustrating an example of portions of a communication session between the initiator device (device A) and a receiver device (device B). The communication session may include a protocol for mutual authentication between the initiator device and the receiver device. The example of FIG. 3 shows the receiver device transmitting a message 305 that includes random number $R_B$. In response to receiving random number $R_B$, the initiator device transmits $R_B$ back to the initiator device in message 310 along with a second random number $R_A$, and initiator device keying information $F_A$. Sending $R_B$ back to the receiver device shows authenticity of the initiator's communication. The values of $R_B$, $R_A$ and $F_A$ may be included in an encrypted concatenation of a session identifier (SID), $R_A$, $R_B$, key identifier ($I_B$), $F_A$, and Text. Including the key identifier $I_B$ and the Text in the encrypted information is optional. The Text may include known information that can be checked by the initiator device. The encrypted information is decrypted by processing circuitry of the receiver device.

Returning to FIG. 2, at block 225, the receiver device transmits random number $R_B$, random number $R_A$, and the receiver device key information $F_B$ to the initiator device. In the example of FIG. 3, initiator device transmits $R_B$, $R_A$, and $F_B$ in an encrypted message 315 that includes an encrypted concatenation of a SID, $R_B$, $R_A$, $F_B$, and optional Text. Because both random numbers are exchanged multiple times between the two devices keying material $F_A$ and $F_B$ is used for key creation. Exchanging the keying material $F_A$ and $F_B$ separately also provides additional security. After communication 315 in FIG. 3, both the receiver device and the initiator device have the keying material $F_A$ and $F_B$. The devices each calculate an encryption key (e.g., a session encryption key) using key information $F_A$ and $F_B$.

In one example, the session key ($K_{SESSION}$) is calculated as $$K_{SESSION}=\text{KDF}(K_{STATIC}, F_A \| F_B),$$

where $K_{STATIC}$ is a static device key and $F_A \| F_B$ is the concatenation of the key information or key material. Other combinations of $F_A$ and $F_B$ can be used to calculate the session key. Because both devices use the same key material to calculate the encryption key, the calculated encryption key matches in both devices.

At block 230 in FIG. 2, when the mutual authentication by the devices is completed, encrypted information is exchanged between the devices. The information is encrypted by the processing circuitry of the devices using the calculated encryption key (e.g., $K_{SESSION}$).

As explained previously herein, the random number $R_B$ used to create a scriptable session encryption key may be a true random number. Optionally, the random number $R_B$ can be based on a counter, such as a pseudo random counter with $$R_B=\text{PRF}(\text{counter}),$$

where PRF is a pseudo random function that generates a pseudo random number using the value of the counter as a seed. The $R_B$ determined using the counter should be bound to a context of the communication session. It should be noted that the value of the counter itself is not transmitted. This may avoid disclosing that there is a key and that the key is calculated using a pseudo random number instead of a real random number.

Using a random number based on a counter provides the advantage that the random number cannot have the same value twice. A disadvantage is that the counter needs to be updated. This can lead to stressing of the non-volatile memory of the receiver device. The counter may be updated after every communication session. In variations, the counter is updated after the first exchange of information of an authentication session (e.g., after the first communication of random number $R_B$). The counter should not be allowed to overflow to avoid using the same counter a second time. If the counter is allowed to overflow, in the event of overflow the static key and the counter should be updated before they are used again.

The systems, devices, and methods described herein provide communication of encryption keys according to a scriptable transaction for secure messaging between two devices. The scriptable communication provides encryption keys based on random numbers. The random numbers can be true random numbers or based on a counter. The value of the counter does not need to be transmitted which can improve security and privacy protection. Additionally, writes to non-volatile memory to are reduced by eliminating the need to store a counter value.

4

Figure 4:
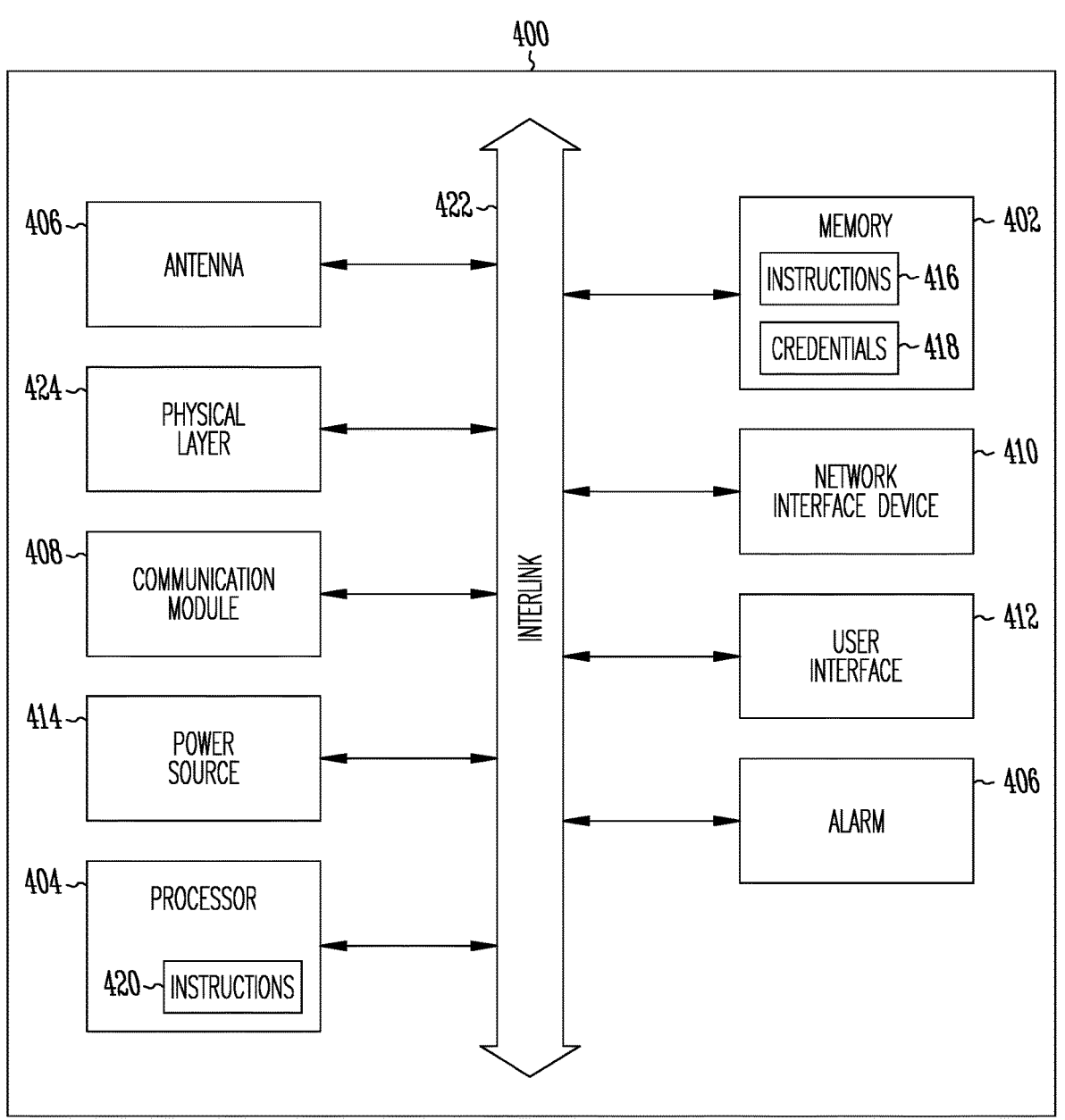
FIG. 4 is a block diagram schematic of portions of an example of a verifier device.

FIG. 4 is a block diagram schematic of various example components of a device 400 (e.g., an embedded device) for supporting the device architectures described and illustrated herein. The device 400 of FIG. 4 could be, for example, a verifier device (or other initiator device) that authenticates credential information of authority, status, rights, and/or entitlement to privileges for the holder of a credential device. The verifier device may be a server of the backend of an authentication system. In variations, the verifier device may be a reader device of a physical access control system (PACS). A reader device of a PACS retrieves and authenticates an access credential when a credential device is used and sends the access credential to an access controller. The access controller compares the access credential to an access control list and grants or denies access based on the comparison, such as by controlling an automatic lock on a door for example. In variations, the reader device performs the functions of the access controller.

With reference specifically to FIG. 4, additional examples of a device 400 for supporting the device architecture described and illustrated herein may generally include one or more of a memory 402, processing circuitry such as processor 404, one or more antennas 406, a communication port or communication module 408, a network interface device 410, a user interface 412, and a power source 414 or power supply.

Memory 402 can be used in connection with the execution of application programming or instructions by processing circuitry, and for the temporary or long-term storage of program instructions or instruction sets 416 and/or authorization data 418, such as credential data, credential authorization data, or access control data or instructions, as well as any data, data structures, and/or computer-executable instructions needed or desired to support the above-described device architecture. For example, memory 402 can contain executable instructions 416 that are used by a processor 404 of the processing circuitry to run other components of device 400, to calculate encryption keys to communicate credential or authorization data 418, and/or to perform any of the functions or operations described herein, such as the method of FIG. 2 for example. Memory 402 can comprise a computer readable medium that can be any medium that can contain, store, communicate, or transport data, program code, or instructions for use by or in connection with device 400. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

The processing circuitry of the device 400 is configured (e.g., by firmware) to perform the functions of verifier devices described herein. Such as the functions of the example method of FIG. 2. The processing circuitry can correspond to one or more computer processing devices or resources. For instance, processor 404 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 404 can be provided as a microprocessor, Central Processing Unit (CPU), or plurality of microprocessors or CPUs that are configured to execute instructions sets stored in an internal memory 420 and/or memory 402.

Antenna 406 can correspond to one or multiple antennas and can be configured to provide for wireless communications between device 400 and another device. Antenna(s) 406 can be operatively coupled to physical layer circuitry comprising one or more physical (PHY) layers 424 to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. In an example, antenna 406 may include one or more antennas coupled to one or more physical layers 424 to operate using ultra-wide band (UWB) for in band activity/communication and Bluetooth (e.g., BLE) for out-of-band (OOB) activity/communication. However, any RFID or personal area network (PAN) technologies, such as the IEEE 502.15.1, near field communications (NFC), ZigBee, GSM, CDMA, Wi-Fi, etc., may alternatively or additionally be used for the GOB activity/communication described herein.

Device 400 may additionally include a communication module 408 and/or network interface device 410. Communication module 408 can be configured to communicate according to any suitable communications protocol with one or more different systems or devices either remote or local to device 400. Network interface device 410 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 410 can include an Ethernet port or other physical jack, a Wi-Fi card, a Network Interface Card (NIC), a cellular interface (e.g., antenna, filters, and associated circuitry), or the like. In some examples, network interface device 410 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 406, communication module 408, and/or network interface device 410 or subcomponents thereof, may be integrated as a single module or device, function or operate as if they were a single module or device, or may comprise of elements that are shared between them.

User interface 412 can include one or more input devices and/or display devices. Examples of suitable user input devices that can be included in user interface 412 include, without limitation, one or more buttons, a keyboard, a mouse, a touch-sensitive surface, a stylus, a camera, a microphone, etc. Examples of suitable user output devices that can be included in user interface 412 include, without limitation, one or more LEDs, an LCD panel, a display screen, a touchscreen, one or more lights, a speaker, etc. It should be appreciated that user interface 412 can also include a combined user input and user output device, such as a touch-sensitive display or the like. The user interface 412 may include a separate alarm circuit 426 to indicate an alarm condition such as a relay attack or other security breach. Alarm circuit 426 may provide an audio signal to a speaker or may activate a light or present an alarm condition using a display device.

Power source 414 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 400.

Device 400 can also include one or more interlinks or buses 422 operable to transmit communications between the various hardware components of the device. A system bus 422 can be any of several types of commercially available bus structures or bus architectures.

ADDITIONAL DISCLOSURE AND EXAMPLES

Example 1 can include subject matter (such as a method of device authentication) comprising transmitting a first random number from a receiver device to an initiator device, determining by the receiver device first key information using the first random number, transmitting the first random number, a second random number, and second key information from the initiator device to the receiver device, transmitting the first random number, the second random number, and the first key information from the receiver device to the initiator device, and encrypting information communicated between the initiator device and the receiver device using an encryption key determined using the first key information and the second key information.

In Example 2, the subject matter of Example 1 optionally includes the first random number being a pseudo random number determined using a counter value and the first random number is bound to a specific context of communication between the initiator device and the receiver device.

In Example 3, the subject matter of Example 2, optionally includes updating the counter value for each communication session between the initiator device and the receiver device.

In Example 4, the subject matter of Example 2 optionally includes updating the counter value after the first random number is communicated between the receiver device and the initiator device.

In Example 5, the subject matter of one or any combination of Examples 1-4 optionally includes determining the first key information using a static key and the first random number.

In Example 6, the subject matter of one or any combination of Examples 1-5 optionally includes determining the encryption key using a static key stored in each of the initiator and the receiver devices, the first key information, and the second key information.

In Example 7, the subject matter of one or any combination of Examples 1-6 optionally includes using a verifier device as the initiator device and using a credential device as the receiver device.

In Example 8, the subject matter of one or any combination of Examples 1-6 optionally includes using a smartphone as the receiver device and using a server or an access control device as the initiator device.

In Example 9, the subject matter of one or any combination of Examples 1-6 optionally includes the receiver device being a smart card and the initiator device being a server or an access control device.

Example 10 can include subject matter (such as a verifier device of an authentication system) or can optionally be combined with one or any combination of Examples 1-9 to include such subject matter, comprising physical layer circuitry and processing circuitry operatively coupled to the physical layer circuitry. The processing circuitry is configured to encode an authentication command for sending to a credential device, decode a response communication received from the credential device, wherein the response communication includes a first random number, determine receiver device keying material using the first random number, encrypt the first random number, a second random number, and verifier device keying material for sending to the credential device, decrypt encrypted information received from the credential device, wherein the encrypted information includes the first random number, the second random number, and the receiver device keying material, and calculate a session encryption key using the verifier keying material and the receiver keying material.

In Example 11, the subject matter of Example 10 optionally includes processing circuitry configured to calculate the receiver device keying material using a static key and the first random number.

In Example 12, the subject matter of one or both of Examples 10 and 11 optionally includes processing circuitry configured to calculate the session key using a static key, the verifier device keying material, and the receiver device keying material.

In Example 13, the subject matter of one or any combination of Examples 10-12 optionally includes processing circuitry configured to calculate the first random number by applying a counter value to a pseudo random number function.

In Example 14, the subject matter of Example 13 optionally includes processing circuitry configured to change the counter value used to calculate the random number for each communication session with the credential device.

In Example 15, the subject matter of Example 13 optionally includes processing circuitry configured to change the counter value used to calculate the first random number after an exchange of information with the credential device.

Example 16 includes subject matter (such as a receiver device of an authentication system) or can optionally be combined with one or any combination of Example 1-15 to include such subject matter, comprising physical layer circuitry and processing circuitry operatively coupled to the physical layer circuitry. The processing circuitry is configured to decode an authentication command received from a verifier device, encode a response for sending to the verifier device, wherein the response includes a first random number, decrypt encrypted information received from the verifier device, wherein the encrypted information includes the first random number, a second random number, and verifier device keying material, encrypt the first random number, the second random number and receiver device keying material for sending to the verifier device, and calculate a session encryption key using the verifier device keying material and the receiver device keying material.

In Example 17, the subject matter of Example 16 optionally includes processing circuitry configured to calculate the receiver device keying material using a static key and the second random number.

In Example 18, the subject matter of one or both of Examples 16 and 17 optionally includes processing circuitry configured to calculate the session key using a static key, the verifier device key material, and the receiver device keying material.

In Example 19, the subject matter of one or any combination of Examples 16-18 optionally includes processing circuitry configured to calculate the first random number by applying a counter value to a pseudo random number function.

In Example 20, the subject matter of one or any combination of Example 19 optionally includes processing circuitry configured to change the counter value used to calculate the random number for each communication session with the verifier device.

These several Examples can be combined in any permutation or combination. The above detailed description includes references to the accompanying drawings, which form a part of the detailed description. The drawings show, by way of illustration, specific embodiments in which the invention can be practiced. The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method of device authentication, the method comprising:

transmitting a first random number from a receiver device to an initiator device, wherein the first random number is a pseudo random number determined using a counter value and the first random number is bound to a specific context of communication between the initiator device and the receiver device;

determining, by the receiver device, first key information using the first random number and a static key;

in response to receiving the first random number, determining by the initiator device, the first key information using the first random number and the static key, a second random number, and second key information specific to the initiator device;

transmitting the first random number, the second random number, and the second key information from the initiator device to the receiver device;

transmitting the first random number, the second random number, and the first key information from the receiver device to the initiator device; and encrypting information communicated between the initiator device and the receiver device using an encryption key determined using the first key information and the second key information.

2. The method of claim 1, including updating the counter value for each communication session between the initiator device and the receiver device.

3. The method of claim 1, including updating the counter value after the first random number is communicated between the receiver device and the initiator device.

4. The method of claim 1, including determining the encryption key using a static key stored in each of the initiator and the receiver devices, the first key information, and the second key information.

5. The method of claim 1, wherein the initiator device is a verifier device and the receiver device is a credential device.

6. The method of claim 5, wherein the receiver device is a smartphone and the initiator device is a server or an access control device.

7. The method of claim 5, wherein the receiver device is a smart card and the initiator device is a server or an access control device.

8. The method of claim 1, including transmitting the first random number, the second random number, and the first key information from the receiver device to the authenticating initiator device according to a script included in the receiver device.

9. The method of claim 1, wherein the first key information includes a third random number predictable by the authenticating initiator device.

10. A verifier device of an authentication system, the verifier device comprising:

physical layer circuitry; and processing circuitry operatively coupled to the physical layer circuitry and configured to:

encode an authentication command for sending to a credential device;

decode a response communication received from the credential device, wherein the response communication includes a first random number;

determine receiver device keying material using a static key and the first random number, a second random number, and verifier keying material in response to receiving the first random number;

encrypt the first random number, the second random number, and verifier device keying material for sending to the credential device;

decrypt encrypted information received from the credential device, wherein the encrypted information includes the first random number, the second random number, and the receiver device keying material; and calculate a session encryption key using the verifier device keying material and the receiver device keying material;

wherein the verifier device is a reader device, and the processing circuitry is configured to receive credential information encrypted using the session encryption key and grant physical access to a resource according to the credential information.

11. The verifier device of claim 10, wherein the processing circuitry is configured to calculate the session encryption key using a static key, the verifier device keying material, and the receiver device keying material.

12. The verifier device of claim 10, wherein the processing circuitry is configured to calculate the first random number by applying a counter value to a pseudo random number function.

13. The verifier device of claim 12, wherein the processing circuitry is configured to change the counter value used to calculate the first random number for each communication session with the credential device.

14. The verifier device of claim 12, wherein the processing circuitry is configured to change the counter value used to calculate the first random number after an exchange of information with the credential device.

15. The verifier device of claim 12, wherein the processing circuitry is configured to prevent overflow of the counter value.

16. The verifier device of claim 10, wherein the processing circuitry is configured to decrypt the first random number, the second random number, and the receiver device keying material according to a script included in the verifier device.

17. The verifier device of claim 10, wherein the processing circuitry is configured to receive credential information encrypted using the session encryption key and grant access to a resource according to the credential information.

18. The verifier device of claim 10, wherein the receiver device keying material includes a third random number predictable by the verifier device.

* * * * *